Aug. 17, 1937.　　　　　　U. LAMM　　　　　　2,090,054
ELECTRIC CURRENT CONVERSION DISCHARGE APPARATUS
Filed May 31, 1933
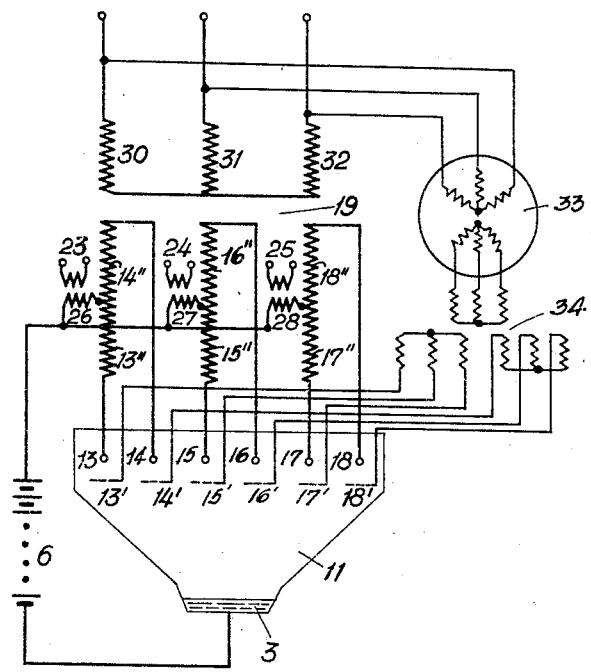
Inventor
Uno Lamm
By W. Wallace White
Attorney Patented Aug. 17, 1937

2,090,054

UNITED STATES PATENT OFFICE 2,090,054

ELECTRIC CURRENT CONVERSION DISCHARGE APPARATUS

Uno Lamm, Ludvika, Sweden, assignor to Allmanna Svenska Elektriska Aktiebolaget, Vasteras, Sweden, a corporation of Sweden Application May 31, 1933, Serial No. 673,669
In Sweden April 25, 1932

1 Claim. (Cl. 175—363)

The present invention relates to electric current converting vapor discharge apparatus for converting into alternating current from direct current or from alternating current of other frequency, and more particularly to such apparatus in which a source of intermittent current is connected between certain points of a transformer feeding said vapor discharge apparatus, the said intermittent current acting to transfer the current from one anode to another of the discharge apparatus.

One form of the invention is diagrammatically illustrated in the drawing.

Referring to the drawing, which shows a three-phase converter, 11 designates the metal vapor apparatus proper, while 3 is the cathode, 13—18 the anodes and 13' to 18' the controlling grids, on which a voltage regulable in phase is impressed over an induction regulator 33 and a transformer 34. The main transformer, generally designated by 19, has three phase windings, each end of which is connected to one of the six anodes. Each half of a winding thus connected bears the number of the corresponding anode with the index ", thus the winding halves are designated 13"—18". The midpoints of the three phase windings are connected together over the secondary windings 26, 27, 28 of a transformer to one point, which is connected to one terminal of the supply circuit, for instance to the positive terminal of the source of direct current 6. The negative terminal of the same source is connected to the cathode 3. The primary windings 23, 24, 25 cooperating with the secondary windings 26, 27, 28 respectively, are fed by an intermittent current, and the voltage of each anode intended to ignite is thereby temporarily raised above that to be extinguished whereby the current is transferred to the former anode, in a manner known in principle. The transformer 19 has also secondary windings 30, 31, 32 feeding the alternating current load circuit.

I claim as my invention:—

In electric current converting vapor discharge apparatus for converting into alternating current from direct current or from alternating current of other frequency, a cathode, a plurality of anodes alternatingly cooperating therewith, control grids for said anodes, transformer windings each connected at each end to a respective anode, other transformer windings cooperating therewith and connected to the load circuit, a source of intermittent current connected between the midpoints of said first mentioned transformer windings, and a supply circuit connected between said cathode and the midpoint of said source of intermittent current.

UNO LAMM.